(12) United States Patent
Schuetze et al.

(10) Patent No.: US 9,370,769 B2
(45) Date of Patent: Jun. 21, 2016

(54) DIESEL OXIDATION CATALYST

(75) Inventors: Frank-Walter Schuetze, Haibach (DE); Anke Woerz, Brussels (BE); Gerald Jeske, Neuberg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 303 days.

(21) Appl. No.: 13/877,764

(22) PCT Filed: Oct. 19, 2011

(86) PCT No.: PCT/EP2011/068229
§ 371 (c)(1),
(2), (4) Date: Apr. 4, 2013

(87) PCT Pub. No.: WO2012/055730
PCT Pub. Date: May 3, 2012

(65) Prior Publication Data
US 2013/0202509 A1 Aug. 8, 2013

(30) Foreign Application Priority Data
Oct. 26, 2010 (EP) ..................................... 10013955

(51) Int. Cl.
*B01J 23/58* (2006.01)
*B01J 29/04* (2006.01)
(Continued)

(52) U.S. Cl.
CPC .............. *B01J 29/04* (2013.01); *B01D 53/944* (2013.01); *B01J 23/52* (2013.01); *B01J 23/66* (2013.01); *B01J 29/08* (2013.01); *B01J 29/18* (2013.01); *B01J 29/7007* (2013.01); *B01J 35/006* (2013.01); *B01J 35/008* (2013.01);
(Continued)

(58) Field of Classification Search
CPC .......... B01J 29/04; B01J 53/944; B01J 23/52; B01J 23/66; B01J 29/08; B01J 29/18; B01J 29/7007; B01J 35/006; B01J 35/008; B01J 35/0086; B01J 35/04; B01J 35/08; B01J 37/0045; B01J 37/0201
See application file for complete search history.

(56) References Cited

U.S. PATENT DOCUMENTS 7,517,826 B2    4/2009    Fujdala et al.
7,534,738 B2    5/2009    Fujdala et al.
(Continued)

FOREIGN PATENT DOCUMENTS

EP    1 925 362 A1    5/2008
EP    2 070 581 A1    6/2009
(Continued)

OTHER PUBLICATIONS

International Search Report for PCT/EP2011/068229 mailed Feb. 2, 2012 (in English).
(Continued)

*Primary Examiner* — Colleen Dunn
*Assistant Examiner* — Haytham Soliman
(74) *Attorney, Agent, or Firm* — Smith, Gambrell & Russell, LLP

(57) ABSTRACT

The present invention relates to a catalytically active material consisting of an inner core (1) and an outer shell (2) surrounding this core, the core being formed from palladium and gold fixed together on a first support oxide, and the shell comprising platinum fixed on a second support oxide, to a diesel oxidation catalyst comprising this catalytically active material, and to an exhaust gas cleaning system comprising this diesel oxidation catalyst.

19 Claims, 1 Drawing Sheet

(51) Int. Cl.
*B01D 53/94* (2006.01)
*B01J 23/52* (2006.01)
*B01J 23/66* (2006.01)
*B01J 29/08* (2006.01)
*B01J 29/18* (2006.01)
*B01J 29/70* (2006.01)
*B01J 35/00* (2006.01)
*B01J 35/04* (2006.01)
*B01J 35/08* (2006.01)
*B01J 37/00* (2006.01)
*B01J 37/02* (2006.01)

(52) U.S. Cl.
CPC .............. *B01J35/0086* (2013.01); *B01J 35/04* (2013.01); *B01J 35/08* (2013.01); *B01J 37/0045* (2013.01); *B01J 37/0201* (2013.01); *B01D 2255/106* (2013.01); *B01D 2255/1021* (2013.01); *B01D 2255/1023* (2013.01); *B01D 2255/2065* (2013.01); *B01D 2255/2092* (2013.01); *B01D 2255/20715* (2013.01); *B01D 2255/40* (2013.01); *B01D 2255/50* (2013.01); *B01D 2255/9022* (2013.01); *B01D 2255/912* (2013.01); *B01D 2255/9202* (2013.01); *B01D 2258/012* (2013.01); *Y10T 29/49345* (2015.01)

(56) References Cited

U.S. PATENT DOCUMENTS

| | | | |
|---|---|---|---|
| 7,576,031 B2 * | 8/2009 | Beutel et al. | 502/339 |
| 7,709,414 B2 | 5/2010 | Fujdala et al. | |
| 2008/0125308 A1 | 5/2008 | Fujdala et al. | |
| 2010/0092841 A1 * | 4/2010 | Lopez et al. | 429/44 |
| 2010/0189615 A1 * | 7/2010 | Gramiccioni | B01D 53/945 |
| | | | 423/213.2 |
| 2011/0113774 A1 | 5/2011 | Nunn et al. | |

FOREIGN PATENT DOCUMENTS

| | | |
|---|---|---|
| WO | 2008/117941 A1 | 10/2008 |
| WO | 2009/074308 A1 | 6/2009 |
| WO | 2009/106849 A1 | 9/2009 |

OTHER PUBLICATIONS

Written Opinion of the International Searching Authority dated Oct. 26, 2010 received in International Application No. PCT/EP2011/068229.

* cited by examiner

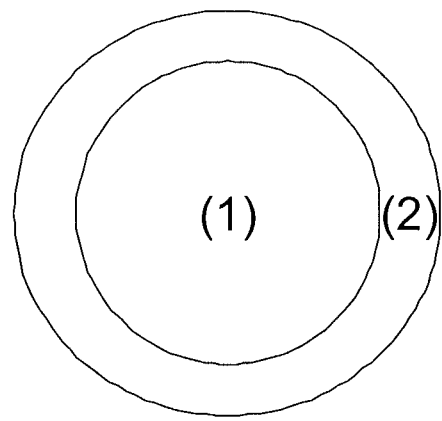

DIESEL OXIDATION CATALYST

The invention relates to a catalytically active material which comprises platinum, palladium and gold as catalytically active components, and to a diesel oxidation catalyst comprising this catalytically active material.

The exhaust gas of diesel engines typically comprises carbon monoxide CO, hydrocarbons HC and nitrogen oxides $NO_x$, and a relatively high oxygen content of up to 15% by volume. In addition, particulate emissions are present, these consisting predominantly of solid soot residues and possibly organic agglomerates (called the "volatile organic fraction" VOF or "soluble organic fraction" SOF) and originating from partially incomplete fuel combustion in the cylinder. The carbon monoxide and hydrocarbon pollutant gases can be rendered harmless by oxidation over a suitable oxidation catalyst. Suitable units for removal of the particulate emissions are diesel particulate filters with or without a catalytically active coating. Nitrogen oxides are nowadays preferably removed by selective catalytic reduction (SCR) to nitrogen with ammonia released from urea solution as a reducing agent ("denoxing" of the exhaust gas), for which it is necessary to add urea solution as an auxiliary from a source independent of the engine to the exhaust gas. In order to be able to comply with the future exhaust gas limits which will apply in Europe, the USA and Japan, systemic combinations of these exhaust gas cleaning technologies will frequently be used.

Diesel oxidation catalysts for oxidative removal of carbon monoxide (CO), gaseous hydrocarbons (HC) and any VOF have long been known in the prior art and have been described in a wide variety of different embodiments. Usually, platinum and/or palladium are used as components active in oxidation catalysis in these catalysts. Whether one of the noble metals is used alone or in combination with others and the ratio in which the noble metals may be present relative to one another depends not uncommonly on the configuration of the exhaust gas system in which the catalyst is to be used, since the noble metals catalyze the different oxidation reactions possible in the system with different effectiveness. For example, platinum is of particularly good suitability for oxidation of nitrogen monoxide NO present in the untreated exhaust gas to nitrogen dioxide $NO_2$, whereas palladium has the highest oxidation activity of all noble metals with respect to short-chain hydrocarbons (HC).

A further oxidation-active noble metal is gold, which is known in the prior art, for example, to have excellent catalysis of the oxidation of carbon monoxide CO to $CO_2$ even at very low temperatures (<100° C.). Gold catalysts have also already been described for oxidative aftertreatment of diesel exhaust gases.

For instance, WO 2009/074308 or EP 2 070 581 A1 discloses a diesel oxidation catalyst which has, on a catalytically inert support body (for example honeycomb), a coating comprising platinum, palladium and a promoter applied to a support oxide, and also zeolite. One usable promoter is gold.

EP 1 925 362, US 2008/0124514, U.S. Pat. No. 7,517,826 and U.S. Pat. No. 7,534,738 disclose diesel oxidation catalysts in which there is a mixture of a first and a second catalytically active material. For production of the first catalytically active material, palladium in addition to gold is supported on a lanthanum oxide-stabilized aluminum oxide. As the second catalytically active material, platinum is applied, optionally together with palladium or bismuth, to lanthanum oxide-stabilized aluminum oxide. The two catalytically active materials may be applied to an inert honeycomb as a homogeneous powder mixture in one catalytically active layer or in the form of a plurality of different coatings (for example as a zone catalyst or layer catalyst). In the case of multilayer catalysts, it is additionally possible for zeolite-containing intermediate layers and/or layers comprising palladium supported on cerium oxide to be present.

WO 2009/106849 discloses diesel oxidation catalysts whose features include high conversion rates for methane and the presence of palladium and gold as active components, preferably in alloyed form. For preparation of the catalysts, palladium ex palladium nitrate and gold ex tetrachloroauric acid are applied by precipitation and calcination to aluminum oxide as the support material. The powder component thus obtained can be used to prepare a suspension for coating of conventional flow honeycombs as the catalyst substrate.

WO 2008/117941 also discloses diesel oxidation catalysts which feature improved HC oxidation activity and comprise palladium alloyed with gold on aluminum oxide as the first catalytically active material, in addition to platinum alloyed with palladium on aluminum oxide as the second catalytically active material. Instead of aluminum oxide, it is also possible to use other inorganic support oxides, for example silicon dioxide, aluminumsilicate, silicates, titanium oxide, zirconium oxide, SiC and carbon black. A diesel oxidation catalyst produced from the mixture of the catalytically active materials may further comprise oxygen-storing rare earth metal oxides.

US 2008/125308A1 describes exhaust gas catalysts which comprise a platinum-containing catalyst and a palladium- and gold-containing catalyst, and which may additionally comprise zeolite as an absorbent for hydrocarbons. The two catalysts are arranged in various catalytically active zones of the exhaust gas catalyst, in such a way that the exhaust gas encounters the platinum catalyst first. This is achieved by means of customary layer or zone arrangement of the two catalysts, or by virtue of the two catalysts being supported on different monoliths.

It is an object of the present invention to provide a diesel oxidation catalyst with improved CO oxidation activity, which also has improved long-term stability under operating conditions even in the event of high thermal stress.

The object is achieved by a catalytically active material consisting of an inner core (1) and an outer shell (2) surrounding this core, the core being formed from palladium and gold fixed together on a first support oxide, and the shell comprising platinum fixed on a second support oxide.

FIG. 1 shows the structure of the inventive catalytically active material composed of inner core (1) and outer shell (2).

The specific structure of the catalytically active material ensures firstly an intensive interaction between palladium and gold which makes a significant contribution to improvement of the CO conversion performance of the resulting catalyst. Secondly, the microscopic separation of the palladium/gold-containing phase from the platinum-containing phase present in the catalytically active material prevents direct interaction between platinum and gold which, in the case of prior art catalysts having comparable compositions, after prolonged purpose-relevant utilization time, leads not uncommonly to irreversible deactivation phenomena in the platinum-containing component. The inventors believe that the form of microscopic separation of the palladium/gold-containing phase and the platinum-containing phase selected in the inventive material enables synergistic interaction of these two catalytically active phases, which results in a catalytically active material having improved CO oxidation activity and excellent HC conversion activity with simultaneously excellent thermal ageing stability.

The noble metals palladium and gold present in the core of the inventive catalytically active material are preferably in the form of alloyed metal clusters. The weight ratio of palladium to gold in the core of the catalytically active material is preferably 0.9-1.1:1, more preferably 1:1.

The outer shell (2) of the inventive catalytically active material, in one embodiment, is formed by platinum fixed on the second support oxide. In preferred embodiments, however, the outer shell (2) comprises palladium as a further noble metal. This may be present in mixed form and/or in alloyed form with the platinum likewise present therein. More preferably, at least a portion of the palladium present in the shell is in alloyed form with platinum. If both noble metals are used in the outer shell, the weight ratio of platinum to palladium is preferably between 12:1 and 1:1, more preferably in the range of 6:1 to 2:1 and most preferably 4:1.

The outer shell (2) preferably surrounds the inner core (1) virtually completely and more preferably completely.

If the overall inventive catalytically active material is considered, the weight ratio of the total amount of noble metals platinum:palladium:gold present in the outer shell (2) and inner core (1), in the particularly preferred embodiments, is 1:1:1.

In further preferred embodiments of the inventive catalytically active material, the outer shell (2) comprises, as well as platinum, or as well as platinum and palladium, additionally a zeolite compound with HC-storing properties. The inventive catalytically active material is thus equipped with a hydrocarbon storage and retention function, the effect of which is that hydrocarbons which cannot yet be converted fully at operating temperatures below the ignition temperature for the hydrocarbon oxidation do not "break through" the resulting diesel oxidation catalyst but are retained in the inventive catalytically active material until temperatures sufficient for HC conversion are attained.

The zeolite compounds are preferably selected from the group consisting of FAU, MOR, zeolite beta, MFI and mixtures thereof. They are present in the outer shell (2) preferably to an extent of 10 to 60% by weight, more preferably to an extent of 20 to 50% by weight and most preferably to an extent of 25 to 35% by weight, based in each case on the total weight of the outer shell (2).

As the first and/or second support oxide, preference is given to using one from the group consisting of cerium oxide, zirconium oxide, aluminum oxide, silicon oxide and mixed oxides and/or mixtures thereof. Particular preference is given to aluminum oxide, aluminum silicates and mixed aluminum-silicon oxides.

The particles of the inventive catalytically active material which, as described above, are formed from inner core (1) and outer shell (2) each of different composition are approximately spherical and preferably have a mean diameter of 1 to 12 μm, more preferably of 3 to 8 μm. The proportion by volume of the core in a spherical particle, in the preferred embodiments of the inventive catalytically active material, is preferably 50 to 80%, more preferably about 60%.

The inventive catalytically active material is prepared by processes known per se to those skilled in the art. Examples of typical process steps which may be employed are the optionally staged coprecipitation and/or coimpregnation of the noble metals from water-soluble precursors onto support oxides, and the systematic grinding of pulverulent precursors to form defined conglomerates. In the course of production of the inventive catalytically active material, however, it should be noted that pH values within the strongly acidic range (i.e. pH <4), and likewise pH values in the strongly basic range (i.e. pH >8), should be rigorously avoided over the entire production process. Preference is given to working within a pH range between pH=5 and pH=7 over the entire production process. If pH variations are necessary during the production process, preference is given to using acetic acid to lower the pH and organic bases such as tetraethylammonium hydroxide (TEAH) to raise the pH.

The present invention also provides a diesel oxidation catalyst consisting of a catalytically inert support body and at least one catalytically active coating applied thereto, characterized in that the coating comprises an above-described catalytically active material.

For production of the inventive diesel oxidation catalyst, processes known to the person skilled in the art are used to make up a coating suspension from the above-described catalytically active material, and this suspension can be applied to an inert support body by likewise known coating processes (dipping, suction and/or pumping processes). The resulting catalyst then consists of a catalytically inert support body and at least one catalytically active coating applied thereto, the latter comprising the inventive catalytically active material. The catalytically inert support body is preferably selected from the group of the ceramic and metallic flow honeycombs or from the group of the ceramic wall flow filter substrates.

If the inventive catalytically active material comprises insufficient zeolite, if any, in the outer shell (2), it is also possible to add a zeolite compound with HC-storing properties to the coating, this being selected from the group consisting of FAU, MOR, zeolite beta, MFI and mixtures thereof. The proportion of the zeolite compound in the coating is then preferably 15 to 45% by weight, more preferably 20 to 30% by weight, based on the total weight of this coating. In the particularly preferred embodiments, however, all of the zeolitic material is present in the outer shell (2) of the catalytically active material, especially with a proportion of 15 to 45% by weight, based on the total weight of the catalytically active material.

The inventive diesel oxidation catalyst is suitable for oxidative reduction of the level of carbon monoxide and/or hydrocarbons in the exhaust gas of diesel engines. For this purpose, the exhaust gas is passed over the diesel oxidation catalyst.

The diesel oxidation catalyst is preferably used as part of an exhaust gas cleaning system which likewise forms part of the subject matter of the present invention.

In the inventive exhaust gas cleaning system, the inventive diesel oxidation catalyst is preferably arranged close-coupled to the engine. A diesel particulate filter is preferably connected downstream of the diesel oxidation catalyst in flow direction of the exhaust gas to be cleaned. The diesel particulate filter may optionally be followed by a denoxing stage, such that effective reduction in the level of all pollutants which are present in the diesel exhaust gas and for which legal limits apply is ensured.

Suitable diesel particulate filters and denoxing stages, such as $NO_x$ stores and SCR catalysts, have been described in the literature and are known to those skilled in the art.

The inventive diesel oxidation catalyst especially features very high CO conversion rates and an exceptionally high thermal aging stability, and thus has important properties indispensible for application in modern exhaust gas cleaning systems for fulfillment, for example, of the legal emissions regulations known as "Euro 5" and "Euro 6". In addition, the inventive catalyst exhibits cost advantages over the catalysts otherwise customary, these generally comprising a much higher proportion of the most expensive noble metal platinum overall.

WORKING EXAMPLE

Step 1: Production of the "Core Material"

For production material forming the core of the inventive catalytically active material, aluminum oxide is suspended in water. While stirring, tetrachloroauric acid and palladium nitrate solution are added to the suspension. After an adsorption time of about one hour, the solids present in the suspension are separated from the liquid phase by filtration and washed with demineralized water until no significant amounts of chloride ions are detectable any longer in the wash water. For removal of any adsorbed chloride ions, the solids are subsequently washed once again with dilute aqueous ammonia solution. Then the solids are dried at about 120° C. over a period of 4 hours with subsequent calcination at 400° C. for a period of 3 hours. The powder thus obtained forms the "core material" for the inventive catalytically active material to be produced in the last stage.

Step 2: Production of the "Shell Material"

For production of the "shell material", aluminum oxide is impregnated to fill the pores first with palladium nitrate solution and then with platinum nitrate solution. The total amount of noble metal to be applied is 2% by mass, based on the total amount of the Pd/Pt-containing aluminum oxide powder. The free-flowing powder thus produced is subsequently dried at 120° C. for a period of 4 hours and then calcined at 400° C. for a period of 3 hours.

Step 3: Production of the Inventive Catalytically Active Material

For production of the inventive catalytically active material, the "core material" produced in step 1 is suspended in water and optionally ground until a mean particle size of 4-8 µm with a very narrow particle size distribution has been attained.

In a second vessel, the "shell material" produced in step 2 is likewise suspended in water and optionally ground until a mean particle size of 1-2 µm with a very narrow particle size distribution has been attained. Optionally, a suitable zeolite compound for storage of the hydrocarbons present in the exhaust gas is added to the suspension thus obtained, this likewise having a very fine particle size distribution and having optionally been ground correspondingly in a separate preparation step.

The two suspensions obtained above are combined and subjected to controlled spray drying. During the spray drying operation, the finely divided particles of the "shell material" form a shell around the coarser particles of the "core material".

Step 4: Production of the Inventive Catalyst

For production of an inventive catalyst, the catalytically active material obtained in step 3 is resuspended in water and applied to a conventional ceramic or metallic flow honeycomb by a customary dipping, suction or pumping process known to those skilled in the art. The amount of the coating suspension and the number of coating steps in the process should be selected such that the honeycomb, after drying at 120° C. and calcination at 400° C. over a period of 3 hours, has an amount of coating of 130 to 150 grams of solids per liter of component volume.

The invention claimed is:

1. A catalytically active material comprising an inner core (1) and an outer shell (2) surrounding this core, the core being formed from palladium and gold fixed together on a first support oxide, and the shell comprising platinum fixed on a second support oxide, wherein particles comprised of the inner core (1) and the outer shell (2) are approximately spherical and have a mean diameter of 1 to 12 µm.

2. The catalytically active material as claimed in claim 1, wherein the outer shell (2) comprises palladium as a further noble metal.

3. The catalytically active material as claimed in claim 1, wherein the outer shell (2) comprises a zeolite compound with HC-storing properties.

4. The catalytically active material as claimed in claim 3, wherein the zeolite compound is selected from the group consisting of FAU, MOR, zeolite beta, NMI and mixtures thereof.

5. The catalytically active material as claimed in claim 3, wherein the zeolite compound is present in a proportion of 10 to 60% by weight, based on the total weight of the outer shell (2).

6. The catalytically active material as claimed in claim 1, wherein the first and/or second support oxide is selected from the group consisting of cerium oxide, zirconium oxide, aluminum oxide, silicon oxide and mixed oxides and/or mixtures thereof.

7. The catalytically active material as claimed in claim 1, wherein the proportion by volume of the inner core (1) in a spherical particle is 50 to 80%.

8. A diesel oxidation catalyst comprising a catalytically inert support body and at least one catalytically active coating applied thereto, wherein the coating comprises the catalytically active material as claimed in claim 1.

9. The diesel oxidation catalyst as claimed in claim 8, wherein the coating comprises a zeolite compound with HC-storing properties selected from the group consisting of FAU, MOR, zeolite beta, MFI and mixtures thereof.

10. The diesel oxidation catalyst as claimed in claim 9, wherein the proportion of the zeolite compound in the coating is 15 to 45% by weight, based on the total weight of the coating.

11. The diesel oxidation catalyst as claimed in claim 8, wherein the catalytically inert support body is selected from the group of the ceramic and metallic flow honeycombs or from the group of the ceramic wall flow filter substrates.

12. A method for reducing the level of carbon monoxide and/or hydrocarbons in the exhaust gas of a diesel engine, comprising:
    passing the exhaust gas over the diesel oxidation catalyst of claim 8.

13. An exhaust gas cleaning system for treatment of the exhaust gases of diesel engines, comprising the diesel oxidation catalyst of claim 8.

14. The exhaust gas cleaning system as claimed in claim 13, further comprising a diesel particulate filter which is connected downstream of the diesel oxidation catalyst in flow direction of the exhaust gas to be cleaned.

15. A method of producing an exhaust gas cleaning system comprising:
    arranging the diesel oxidation catalyst of claim 8 in an exhaust gas contact location within an exhaust gas passageway.

16. The method of claim 15, further comprising positioning a diesel particle filter within the exhaust gas passageway downstream of the diesel oxidation catalyst in a flow direction of the exhaust gas to be cleaned.

17. The catalytically active material as claimed in claim 2, wherein the outer shell (2) comprises a zeolite compound with HC-storing properties.

18. The catalytically active material as claimed in claim 17, wherein the zeolite compound is selected from the group consisting of FAU, MOR, zeolite beta, MFI and mixtures thereof.

19. The catalytically active material as claimed in claim 4, wherein the zeolite compound is present in a proportion of 10 to 60% by weight, based on the total weight of the outer shell (2).

* * * * *